United States Patent [19]
Rivetti et al.

[11] Patent Number: 5,905,615
[45] Date of Patent: May 18, 1999

[54] ELECTRIC POWER DISTRIBUTION SYSTEM WITH AUTOMATIC PROTECTION BREAKERS AND RELATED METHOD

[75] Inventors: Giandomenico Rivetti, Nembro; Fabrizio Lorito, Milan; Serverino Colombo, Dalmine, all of Italy; Jan Teigland, Gjettum, Norway; Rolf Disselnkötter, Mauer, Germany; Erik Carlson, Nesoddtangen, Norway

[73] Assignee: ABB Research Ltd., Zurigo, Switzerland

[21] Appl. No.: 08/956,506

[22] Filed: Oct. 23, 1997

[30] Foreign Application Priority Data

Oct. 25, 1996 [IT] Italy ................... MI96A2222

[51] Int. Cl.$^6$ ........................................... H02H 3/08
[52] U.S. Cl. .............................. 361/63; 361/93
[58] Field of Search .................. 361/62, 63, 64, 361/66, 67, 68, 93; 307/11, 38, 39, 131; 711/154, 156, 157, 158

[56] References Cited

U.S. PATENT DOCUMENTS

| | | | |
|---|---|---|---|
| 4,354,215 | 10/1982 | Van Der Scheer | 361/63 |
| 4,432,031 | 2/1984 | Premerlani | 361/63 |
| 4,689,708 | 8/1987 | Hager et al. | 361/65 |
| 4,814,932 | 3/1989 | Morelli | 361/63 |
| 4,878,144 | 10/1989 | Nebon | 361/96 |

*Primary Examiner*—Jeffrey Gaffin
*Assistant Examiner*—Kim Huynh
*Attorney, Agent, or Firm*—Bryan Cave LLP

[57] ABSTRACT

An electric power distribution system having a number of automatic protection breakers distributed on various levels is disclosed herein. Each protection breaker includes an electronic protection unit to open the breaker, which is controlled based on the amount of current flowing through the breaker and its derivative. Each of the breakers is preferably connected in order to exchange information concerning their respective status. Also disclosed herein is method for controlling the intervention sequence of the mutually interlocked breakers, in which a breaker reports a detected fault condition to its next higher level breaker.

12 Claims, 4 Drawing Sheets

ELECTRIC POWER DISTRIBUTION SYSTEM WITH AUTOMATIC PROTECTION BREAKERS AND RELATED METHOD

BACKGROUND OF THE INVENTION

The present invention relates to a system for distributing electric power, particularly systems for low and medium voltage which comprise automatic protection breakers.

More specifically, the invention relates to a distribution system which comprises automatic protection breakers which are distributed hierarchically on various levels. The invention further comprises a method for controlling the intervention sequence of the automatic breakers, which are mutually interlocked so as to intervene selectively in order to cut out the faulty parts of the system.

These distribution systems are currently protected by means of automatic breakers, in which protection against a short-circuit fault with current values close to the breaking capacity is provided by means of classical electromechanical devices based on the electrodynamic effect of fault currents, which have a reaction time on the order of milliseconds.

Electric power distribution grids have a plurality of said breakers, which are distributed radially on various levels in order to selectively limit the power outage to the part or region of the network affected by the fault.

This selectivity among the various breakers is currently achieved by utilizing the different values of the current and of the intervention times of the protection devices and their different mechanical inertia, which depends on their size (and therefore on the masses involved in the opening movement).

In other words, a breaker to which several other breakers supplying an equal number of loads or subsections of the system are connected has higher settings for the protection device, is larger and has greater inertia than the breakers that it supplies, and therefore does not intervene in case of a fault downstream of the smaller breakers that it supplies. This of course occurs for all the higher levels to which the fault current can propagate.

The size of the breakers is in turn a function of the nominal current of the breaker, and therefore the size allocation of the system, by having to ensure the selectivity requirements, is based not only on the values of the working currents that are present in each node but also on the selectivity requirements, which often require to keep the short-circuit current in the system for longer than actually necessary to interrupt the fault current.

While the need to minimize the fault energy, i.e., damage, requires the fastest possible intervention, the need to select among the breakers the one that must intervene in fact entails slowing the protective intervention. Accordingly, the conventional systems of the prior art do not allow to optimize the size allocation of an electric power distribution system as regards the protection breakers.

SUMMARY OF THE INVENTION

The aim of the present invention is to overcome the drawbacks of the prior art and particularly to provide an electric power distribution system which has optimum size allocation of the breakers and ensures both characteristics, namely quick intervention and assured selectivity.

This aim is achieved by means of the present invention, which comprises a plurality of automatic protection breakers distributed on at least two levels, characterized in that each one of the breakers comprises an electronic protection unit which opens the breaker depending on the values of a current ($i(t)$) flowing in the breaker and of its derivative ($di(t)/dt$), and in that there are provided means for interconnecting the breakers in order to exchange information concerning the fault conditions in addition to their state.

The present invention further consists of a method for controlling the intervention sequence of automatic protection breakers in an electric power distribution system, which are mutually interlocked and distributed on at least two levels, characterized in that when a breaker detects a fault condition, said breaker reports it to a breaker at the next higher level, blocking its opening action; and in that the higher-level breaker, if it detects the same fault condition, reports the corresponding information to the upstream breaker, if any, blocking its opening action; and in that said reporting process stops when the highest hierarchical level of the structure is reached or when one of the breakers no longer detects any fault condition.

Advantageously, fault detection is based both on the instantaneous value of the circulating current and on its derivative.

BRIEF DESCRIPTION OF THE DRAWINGS

Further characteristics and advantages of the present invention are described in the appended claims.

The present invention is now described with reference to the accompanying drawings, which relate to two preferred but non-limitative embodiments of the invention.

In the drawings:

FIG. 1 is a schematic view of part of an electric power distribution system according to the present invention;

FIG. 2 is a view of the structure for acquiring the current values ($i(t)$), digitally processing said values and actuating the opening kinematic system, provided in a breaker used in the present invention;

Figure 4:
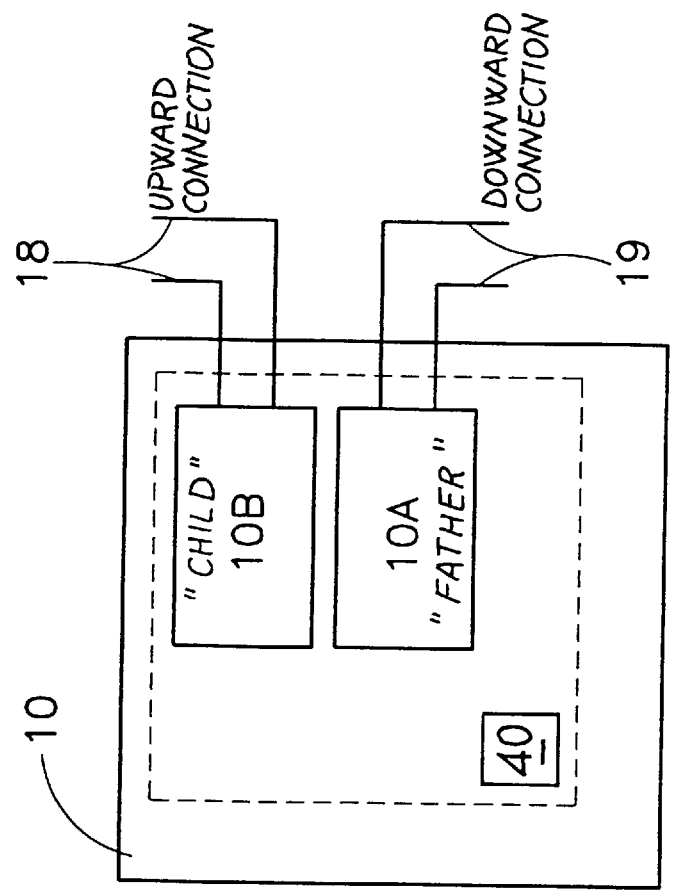
Figure 3:
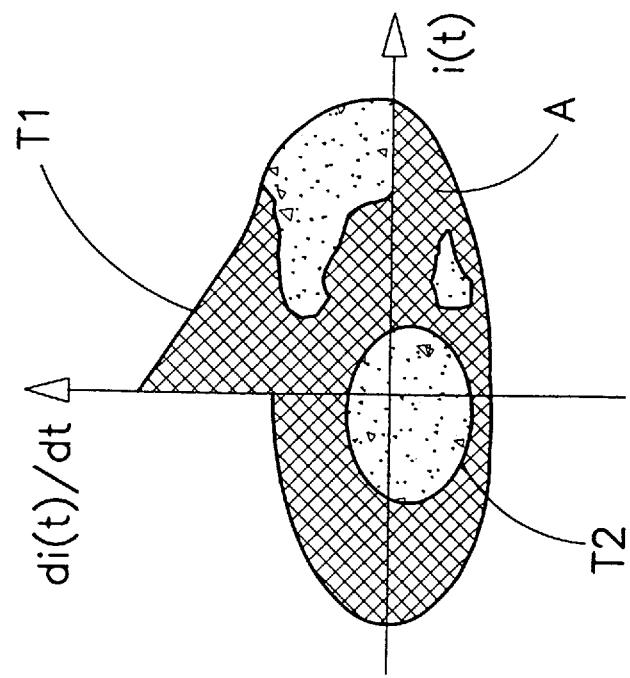
Figure 5:
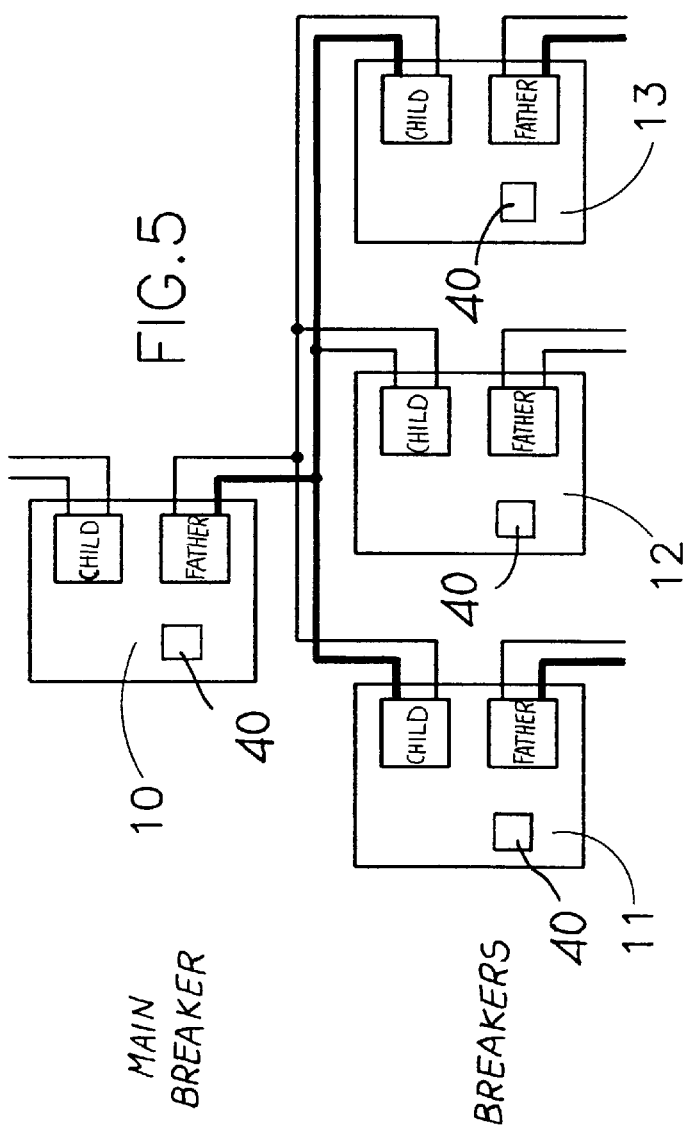
Figure 6:
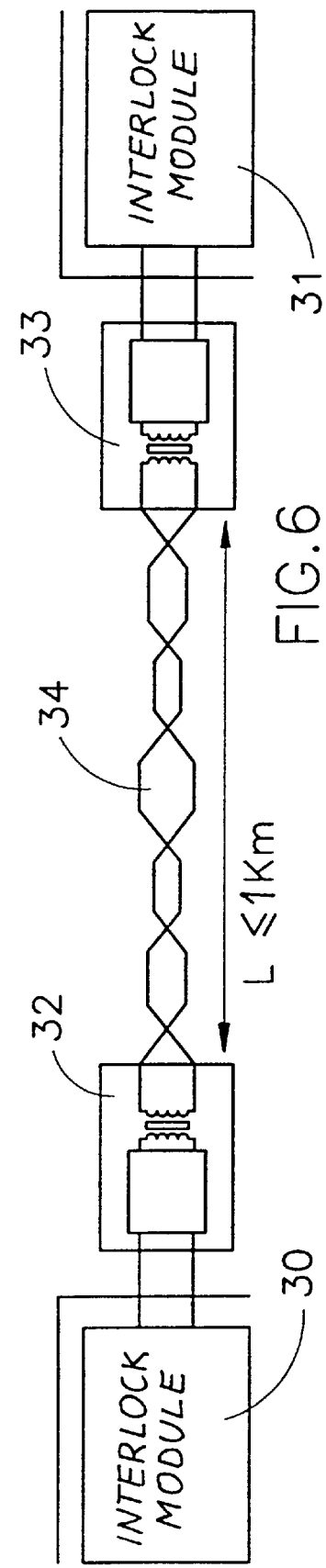

FIG. 3 plots an example of a set of acceptable operating conditions;

FIG. 4 is a view of the interlock structure (divided into two sections) of a single breaker;

FIG. 5 is a view of a configuration of breakers interlocked with a short connection; and FIG. 6 is a view of a configuration of breakers interlocked by means of long connections.

In the various figures, the same reference numerals are used to designate identical or substantially equivalent components.

DESCRIPTION OF THE PREFERRED EMBODIMENTS

Figure 1:
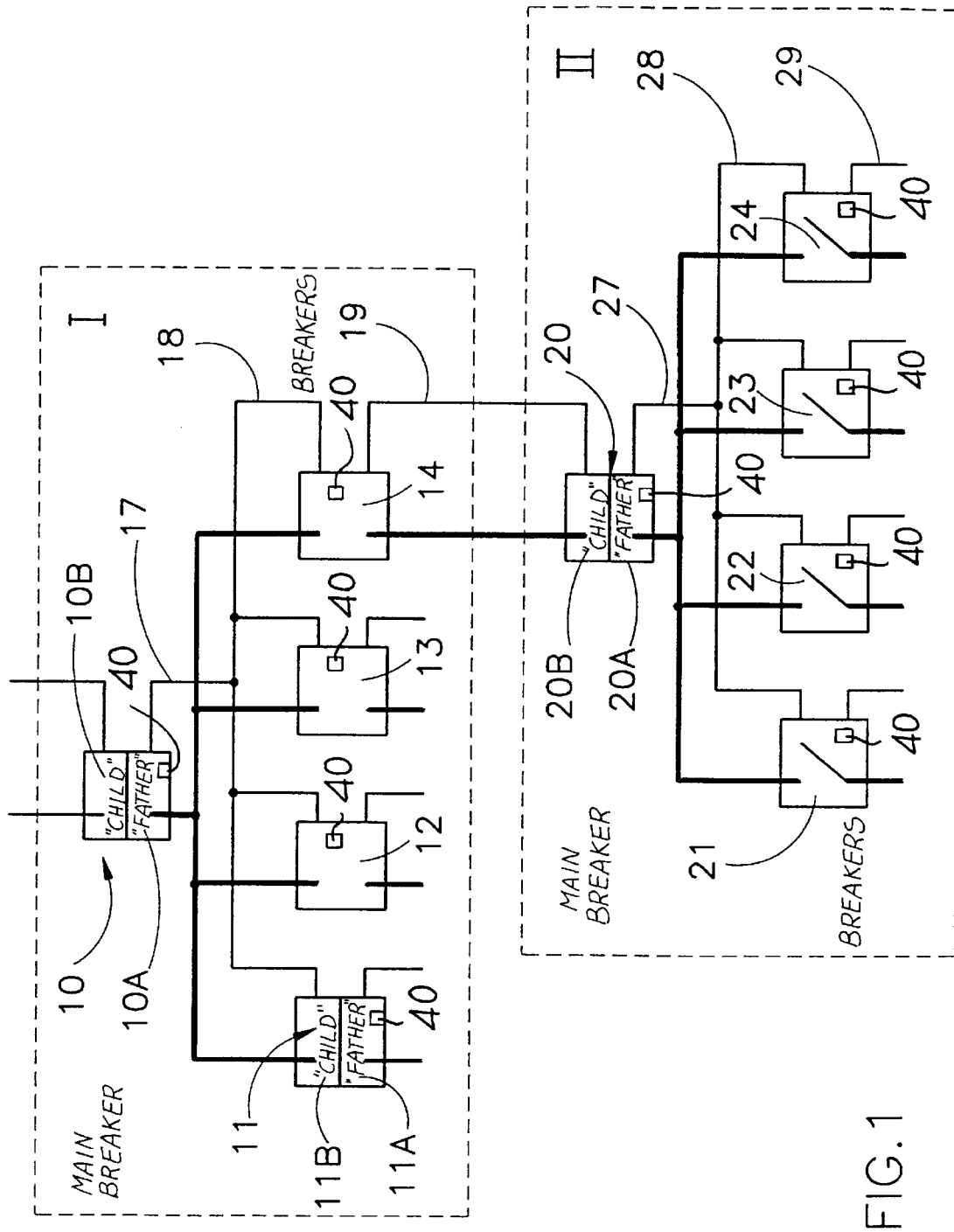

FIG. 1 schematically illustrates part of an electric power distribution system according to the present invention, which comprises an electrical panel I which contains a breaker 10 and four breakers 11, 12, 13 and 14, cascade-connected to the breaker 10; each one of said four breakers 11–14 supplies a corresponding load. The system can be applied to three-phase distribution (with three or four wires), two-phase distribution and phase-neutral distribution, although for the sake of simplicity in illustration it is shown with a single wire in FIG. 1.

Moreover, the figure shows only the load constituted by a panel II, which in turn contains a breaker 20 to which four breakers 21, 22, 23 and 24 are cascade-connected; each one of said four breakers is in turn connected to a further load (not shown).

FIG. 1, in addition to the connections between the breakers which allow the flow of electric power (shown in thick lines), also shows connections 17, 18, 19, 27, 28, 29 over which information travels; said information is exchanged unidirectionally or bidirectionally among the various breakers.

FIG. 1 clearly shows that the breakers are distributed on various levels (four levels are shown in the figure) and that other breakers of the same level can be provided in parallel to the "main" breakers 10 and 20. Finally, the star configuration of the system shown by way of example in FIG. 1 is non-limitative.

In case of a fault that affects, for example, the breaker 24 (short circuit or ground fault current in the circuit downstream of the breaker 24), the system according to the present invention provides an interlock condition which ensures not only fast opening of the breaker 24 but also ensures that the higher-level breakers 20, 14 and 10 remain closed.

With reference also to FIG. 4, the base element of the system is constituted by the single breaker 10, which is divided into two sections, designated respectively as "father" section 10A and "child" section 10B.

Each breaker is connected with the upstream and downstream breakers that belong both to the same panel and to different panels. According to the invention, two kinds of connection, termed respectively "upward connection" and "downward connection", are defined for each breaker.

The "upward connection" identifies a connection to the so-called "child" section 10B of the breaker, while the "downward connection" identifies a connection to the so-called "father" section 10A of the breaker. Accordingly, a breaker is simultaneously father with respect to the breakers at the next lower hierarchical level and child with respect to the upstream breaker to which it is connected.

When a breaker detects a fault condition, it reports it to the "father" section of the breaker at the next higher hierarchical level, thus blocking its opening action. If the breaker that receives the information is in turn a "child" with respect to an upstream breaker and if it, too, detects the same fault condition, it reports it to its "father" breaker, and so forth. This communication process ends in one of the following two ways: either when the highest hierarchical level of the structure is reached, or when a breaker of the communication network does not detect a fault. It should be noted that a plurality of "children" can report simultaneously.

Figure 2:
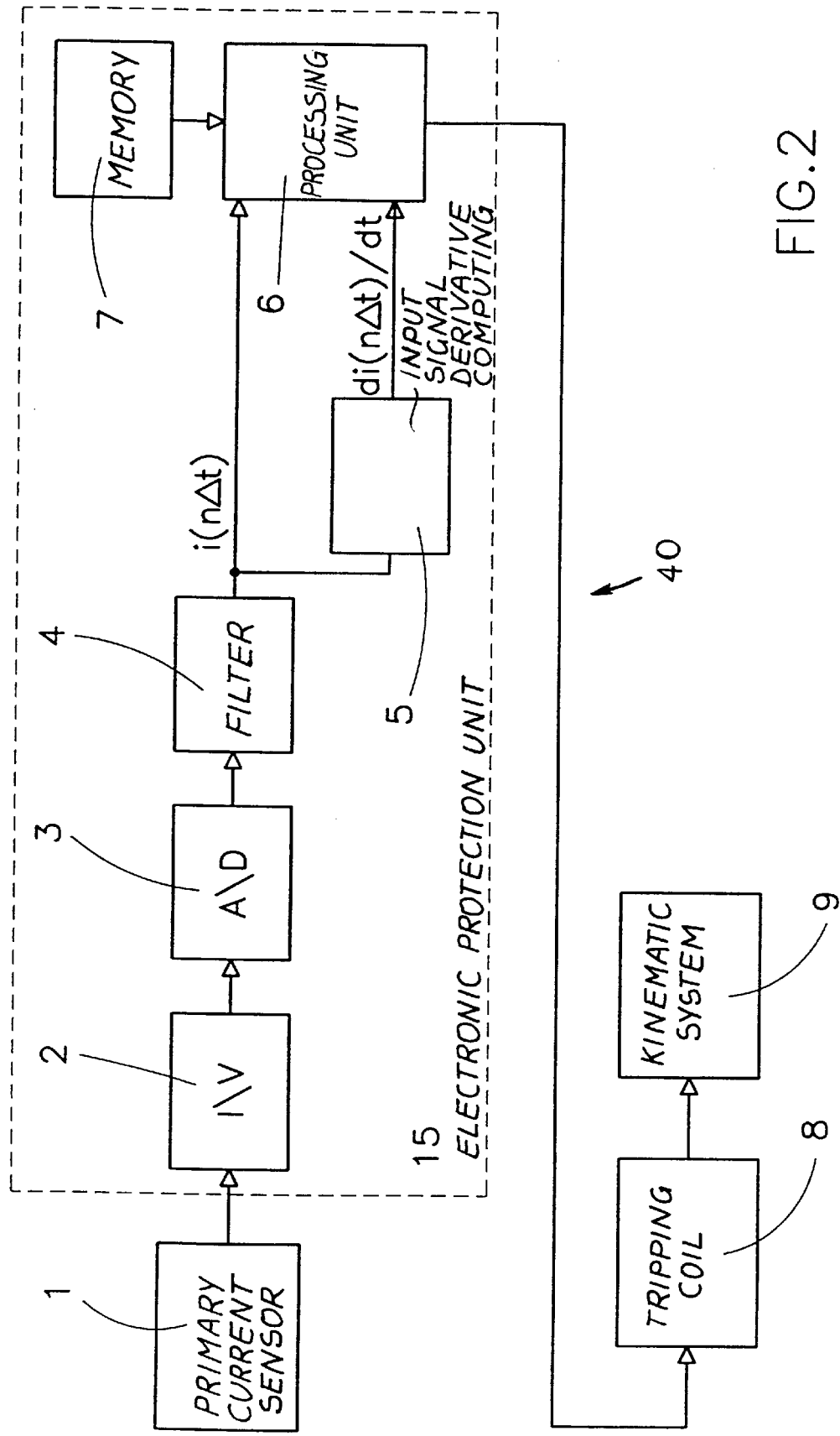

FIG. 2 illustrates in greater detail the structure of the elements that compose the part for acquiring and processing the values of the current (i(t)) that is present in a breaker used in this invention.

Said structure comprises a primary current sensor 1, which is capable of detecting the current that circulates in the power supply conductor that is connected to the breaker. The sensor 1 is connected to an electronic protection part 15 which comprises, in a mutual series arrangement, a converter 2, an A/D converter 3 and a filter 4. The filter output 4 is connected to a processing unit 6 both directly and by means of a block 5 which is capable of computing the derivative of the input signal.

The processing unit 6 has a memory 7 and its output is connected to a tripping coil 8 of the breaker, which actuates a kinematic system 9 for opening the breaker.

Operation of the above-described breaker is as follows. The sensor 1 detects the currents that circulate in the primary circuit and the resulting analog signal is converted into a voltage signal by the converter 2. The voltage signal is then converted into a digital form (for digital processing) by the analog-digital converter 3 and then filtered in the filter 4, which is of the antispike type and introduces a minimal delay.

Preferably, the filter 4 is a third-order elliptical digital filter, with a cutoff frequency at 1 kHz. Since fault detection is based on the instantaneous values of the current (converted into a voltage) and on their derivatives, filtering has the purpose of preventing signals having relatively low current values (which cannot therefore be ascribed to a short circuit) but with a high value of their first derivative from compromising the overall performance of the protection.

The block 5 computes the instantaneous values of the derivative $di(t)/dt$ of the signal that represents the circulating current $i(t)$. Preferably, the block 5 uses a second-order derivative (digital) filter which has a passband of 5 kHz, which is sufficient to precisely detect the derivatives of the currents of a short-circuit fault.

The processing unit 6 thus receives in input a signal which represents the current and a signal which represents its derivative, and the two values define a point or vector on the plane $i(t)-di(t)/dt$, as shown in FIG. 3.

FIG. 3 illustrates an acceptable operating region A; i.e., it defines the locus of the points that belong to normal operating states, including those representing overload but not a short circuit. The points outside the area A represent abnormal operating conditions or conditions which in any case require protective intervention.

In this plane, a time-variable current defines a path such as those designated by T1 and T2 in the figure. As long as said path, for example T2, remains within the area A (or non-shorting area), the situation is considered "normal".

If the path, T1 in the figure, leaves this region, the situation is considered as a short circuit. A comparison is thus performed in the block 6, moment by moment, between the pairs of variables $i(t)$ and $di(t)/dt$ that arrive from the primary circuit and the pairs that form the non-short circuit region.

When a fault condition is reported, the device emits a tripping signal for the solenoid of the coil 8, which opens the breaker by acting on its kinematic system.

In order to ensure the necessary selectivity, according to the present invention an exchange of information is ensured among the breakers that are present in the various nodes of the system and which may have detected the fault simultaneously.

Communication is particularly swift in order to ensure the exchange of information among the breakers in a time which on the one hand ensures the intervention of the breaker directly involved before the current reaches excessively high values and on the other hand allows to block other breakers upstream of the fault. Typically, communication with the next level is achieved in less than 100 microseconds.

Reliability of the communications system is achieved by duplicating the messages exchanged among the various breakers and by means of a self-monitoring (performed by the electronic protection itself) of the efficiency and correct functionality of the transmission medium and of the circuit components that handle transmission.

As mentioned, the aim of the system is to avoid opening breakers at a higher hierarchical level when the fault has already been recognized by a breaker located downstream. The system handles both short circuit faults and ground faults.

The communications system is capable of communicating several fault conditions. In particular, faults associated with messages designated by the codes E, G, and SOS are considered. The E message indicates a fault of the EFDP (Early Fault Detection Prevention, i.e. a short circuit fault type) detected downstream. The G message indicates a Ground Fault and the SOS message indicates an opening command due to mechanical problems downstream.

The interlock communication pattern or configuration is of the kind shown in Table 1.

TABLE 1 message
0 1 0 E E G G S S where the level of the signal can assume a low value (0) or a high value (1). The first three bits of the message constitute a fixed synchronization signal, while the rest of the message contains data. The first three bits always have a 0 1 0 configuration, and this allows to compensate for any synchronization losses. The following Table 2 lists all possible message configurations and shows that the "010" combination always occurs in the same position, i.e., at the beginning of the synchronization configuration.

TABLE 2

|   |   |   | E | E | G | G | S | S |   |   |   | E | E |
|---|---|---|---|---|---|---|---|---|---|---|---|---|---|
| 0 | 1 | 0 | 0 | 0 | 0 | 0 | 0 | 0 | 0 | 1 | 0 | 0 | 0 |
| 0 | 1 | 0 | 0 | 0 | 0 | 0 | 0 | 0 | 0 | 1 | 0 | 1 | 1 |
| 0 | 1 | 0 | 0 | 0 | 0 | 0 | 1 | 1 | 0 | 1 | 0 | 0 | 0 |
| 0 | 1 | 0 | 0 | 0 | 0 | 0 | 1 | 1 | 0 | 1 | 0 | 1 | 1 |
| 0 | 1 | 0 | 0 | 0 | 1 | 1 | 0 | 0 | 0 | 1 | 0 | 0 | 0 |
| 0 | 1 | 0 | 0 | 0 | 1 | 1 | 0 | 0 | 0 | 1 | 0 | 1 | 1 |
| 0 | 1 | 0 | 0 | 0 | 1 | 1 | 1 | 1 | 0 | 1 | 0 | 0 | 0 |
| 0 | 1 | 0 | 0 | 0 | 1 | 1 | 1 | 1 | 0 | 1 | 0 | 1 | 1 |
| 0 | 1 | 0 | 1 | 1 | 0 | 0 | 0 | 0 | 0 | 1 | 0 | 0 | 0 |
| 0 | 1 | 0 | 1 | 1 | 0 | 0 | 0 | 0 | 0 | 1 | 0 | 1 | 1 |
| 0 | 1 | 0 | 1 | 1 | 0 | 0 | 1 | 1 | 0 | 1 | 0 | 0 | 0 |
| 0 | 1 | 0 | 1 | 1 | 0 | 0 | 1 | 1 | 0 | 1 | 0 | 1 | 1 |
| 0 | 1 | 0 | 1 | 1 | 1 | 1 | 0 | 0 | 0 | 1 | 0 | 0 | 0 |
| 0 | 1 | 0 | 1 | 1 | 1 | 1 | 0 | 0 | 0 | 1 | 0 | 1 | 1 |
| 0 | 1 | 0 | 1 | 1 | 1 | 1 | 1 | 1 | 0 | 1 | 0 | 0 | 0 |
| 0 | 1 | 0 | 1 | 1 | 1 | 1 | 1 | 1 | 0 | 1 | 0 | 1 | 1 |

The next six bits are dedicated to the three possible "simple" states E, G and S, and a state is repeated for two bits (EE, GG, SS) in order to increase immunity to noise. The level 1 of these bits indicates the presence of the corresponding fault, while the level 0 indicates that there is no fault.

During communications there is a startup step that also includes synchronization.

Depending on the allocation of the breaker (within a same panel or in different panels), two different kinds of connection are defined. A bidirectional or "short" connection is provided when the breakers belong to the same panel and therefore the communication path is not longer than approximately 10 meters. In this case, there is a father breaker connected to a plurality of child breakers, as shown by way of example in FIG. 5, which illustrates a typical configuration of interlocked breakers with a short connection 18. Only the information-carrying connections have been shown in the figure for the sake of simplicity.

A unidirectional or "long" connection is provided when the breakers belong to different panels and the communication path reaches lengths of up to 1 km. In this case there is a single connection between a father breaker connected to a single child breaker.

In long connections, owing to the length of the communication path, which is considerably longer than the previous one, electrical insulation is usually provided, as well as impedance matching of the communication line from single-ended to balanced or differential, and filtering of the noise impinging on the transmission line. The long connection can also provide for the use of optical fibers with the corresponding hardware modifications (the adapter and the transmission medium change). In some particular configurations, impedance matching (both with an isolating transformer and with optical fibers) may be omitted.

FIG. 6 illustrates a typical configuration of breakers interlocked by means of long connections, in which an external module (respectively 32 and 33 in the figure) is interposed between the line 34 and the communication modules for interlock 30 and 31. As shown schematically, each one of said modules 32, 33 comprises an isolating transformer with a winding which is balanced toward the line 34 and a noise filter block. In practice, the need to use a "short" or "long" connection depends not only on the "length" of said connection but also on the need to have more than one child or on the need, in particular architectures, to have or not have unidirectional connections. Accordingly, the connections, together with the associated hardware and algorithm, are both available for the various possible requirements.

What is claimed is:

1. An electric power distribution system, comprising a plurality of automatic protection breakers distributed on at least two hierarchical levels, wherein each one of the breakers comprises an electronic protection unit which opens the breaker depending on the values of a current flowing in the breaker and of the derivative of said current, and wherein the system further comprises means for mutually connecting the breakers in order to exchange information concerning fault conditions of the breakers in addition to the state of the breakers.

2. The system according to claim 1, wherein each one of the breakers is divided into two sections, respectively a "father" section and a "child" section, and wherein the means for mutually connecting the breakers mutually connect the "child" sections of the breakers of a same level and connect them to the "father" section of a breaker of the next higher level, and connect the "father" section of a breaker to the "child" section of a breaker of the next lower level.

3. The system according to claim 2, wherein the system has at least one primary breaker and a plurality of breakers which are cascade-connected with respect to the primary breaker, by said means for mutually connecting the breakers.

4. The system according to claim 3, wherein when the breakers belong to the same level, said means for mutually connecting the breakers comprise a bidirectional connection.

5. The system according to claim 3, wherein when the breakers belong to different levels, said means for mutually connecting the breakers comprise a unidirectional connection.

6. The system according to claim 5, wherein the unidirectional connection can use external modules, each whereof comprises an isolating transformer with balanced winding and a noise filter block.

7. The system according to claim 1, wherein the electronic protection unit comprises a converter which is series-connected to an A/D converter and to a filter, wherein the output of the filter is connected to a processing unit, both directly and by means of a block capable of computing the derivative of the input signal, and wherein a memory is connected to the processing unit.

8. The system according to claim 7, wherein the output of the processing unit is connected to a device for tripping the breaker.

9. The system according to claim 8, further comprising a primary current sensor connected to the electronic protection unit.

10. The system according to claim 1, wherein the electric power distribution system is a low- and medium-voltage system.

11. A method for controlling the intervention sequence of automatic protection breakers in an electric power distribution system, said breakers being mutually interlocked and distributed on at least two levels, wherein when a breaker detects a fault condition it reports it to a next higher breaker, blocking its opening action, and wherein the higher-level breaker, by detecting the same fault condition, reports the corresponding information to an upstream breaker, if present, blocking its opening action; and wherein the reporting steps stop when a maximum hierarchical level of the structure is reached or when one of the breakers no longer detects any fault condition.

12. The method according to claim 11, wherein the fault condition is determined on the basis of the values of the current flowing in the breaker and of the derivative of said current.

* * * * *